United States Patent
Fice et al.

(10) Patent No.: US 6,895,023 B2
(45) Date of Patent: May 17, 2005

(54) PACKET-BASED OPTICAL COMMUNICATIONS NETWORKS

(75) Inventors: Martyn Fice, Royston (GB); Jonathan King, Thetford (GB)

(73) Assignee: Nortel Networks Limited, St. Laurent (CA)

(*) Notice: Subject to any disclaimer, the term of this patent is extended or adjusted under 35 U.S.C. 154(b) by 846 days.

(21) Appl. No.: 09/734,976

(22) Filed: Dec. 11, 2000

(65) Prior Publication Data
US 2005/0053058 A1 Mar. 10, 2005

(51) Int. Cl.[7] ................................................. H04J 3/06
(52) U.S. Cl. ........................ 370/509; 370/474; 398/51
(58) Field of Search ................................. 348/465, 468, 348/564, 722, 725, 726; 370/213, 232, 235, 265, 468, 469, 470, 471, 472, 474, 475, 477, 480, 492, 497, 503, 504, 508, 509, 511, 512, 513, 517, 518, 520, 543; 375/110, 116; 398/12, 18, 20, 37, 42, 49, 51, 54

(56) References Cited

U.S. PATENT DOCUMENTS

| | | | |
|---|---|---|---|
| 4,794,626 A | * 12/1988 | Tanabe et al. | 375/368 |
| 5,708,475 A | * 1/1998 | Hayashi et al. | 348/468 |
| 5,831,752 A | * 11/1998 | Cotter et al. | 398/54 |
| 5,841,560 A | * 11/1998 | Prucnal | 398/101 |
| 6,694,098 B1 | * 2/2004 | Warbrick et al. | 398/54 |

OTHER PUBLICATIONS

A. Bononi, F. Forghieri, P.R. Prucnal, "Self–Clocking Scheme For Bit Synchronisation In Ultrafast Packet Switching Transparen Opitcal Networks", May 13th 1993, Electonics Letters, vol. 29, No. 10, pp. 872–873.*

"Self–Clocking Scheme for Bit Synchronisation inUltrafast Packet Switching Tansparent Optical Networks," by A. Bononi, F. Forghieri and P.R. Prucnal, Electronics Letters, vol. 29, No. 10, May 13, 1993.

* cited by examiner

*Primary Examiner*—Wellington Chin
*Assistant Examiner*—John Shew
(74) *Attorney, Agent, or Firm*—Barnes & Thornburg

(57) ABSTRACT

A structure for an optical packet for transmission over an optical network comprises a packet header (30) and a packet payload (32). The header comprises first and second sections (34, 36). The first section (34) comprises a series of clock pulses (40) at the data rate of the second section of the packet header, or a multiple or sub-multiple thereof. This header structure enables the clock pulses in the first section (34) to be used to control the timing instants when the header information in the second section (36) is read. The header information can thus be read using the data in the header alone, without needing to alter the structure of the packet payload. The clock pulses can be delayed in order to enable them to be used to control the reading of data in the second section of the packet header. The invention ca be used in optical communications networks.

15 Claims, 5 Drawing Sheets

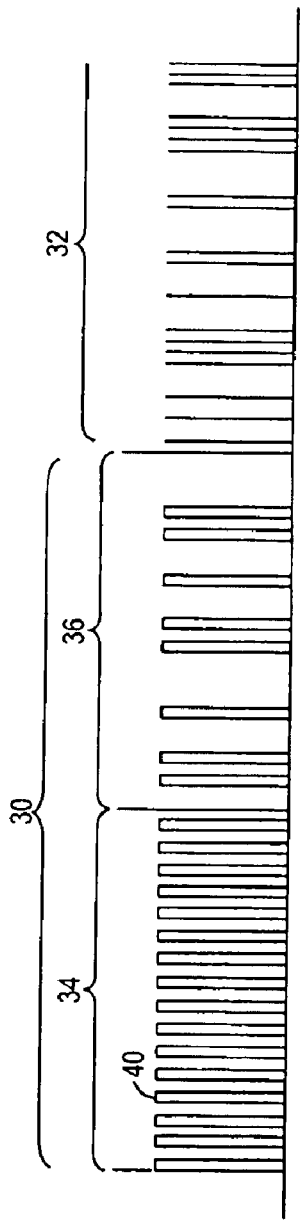
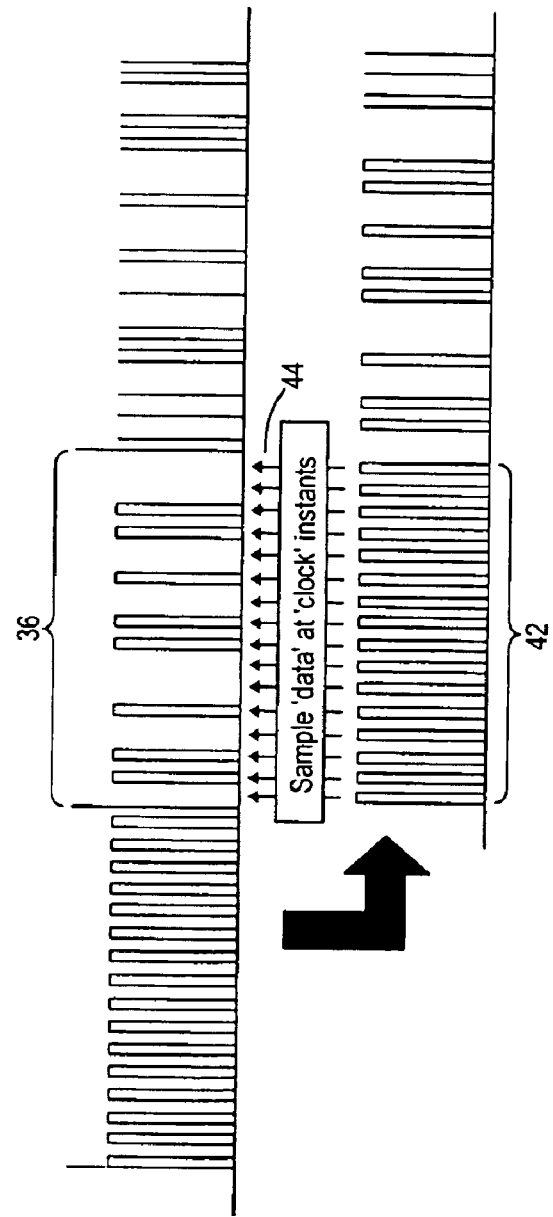

PACKET-BASED OPTICAL COMMUNICATIONS NETWORKS

FIELD OF THE INVENTION

This invention relates to the field of optical communication networks, and in particular to the processing of packet-based optical signals and to the information stored in the packet headers of such signals.

BACKGROUND OF THE INVENTION

The advantages of packet-based networks are well known. Such systems allow more flexible and efficient use of bandwidth than circuit switched systems.

The recent rapid increase in transmission capacity achieved by optical transmission systems far exceeds the improvements in electronic processing speeds. The conversion of high data rate optical signals into the electrical domain and the processing of such signals provides difficulties and may limit the data handling rates within optical networks. However, this conversion and processing can be required for performing switching and routing functions, and is recognised as causing a restriction.

There have been proposals which provide all-optical networks in which switching and routing take place in the optical domain, thereby avoiding the electrical conversion and processing stages. One proposal involves the use of time-shift keying, but the fine tolerances in timing and delay compensation present serious difficulties.

An alternative proposal is to provide a packet header with information optically encoded at a lower data rate than the data rate of the packet payload. This enables opto-electric conversion circuitry to be employed which has a lower detection bandwidth than that which would be required to carry out opto-electric conversion of the packet payload. Thus, low cost electronics can be used to enable the header to be read for routing purposes, and high speed conversion is required only when the payload data is to be read, at the destination node for the particular signal. The invention concerned specifically with optical data packets of this type.

One particular problem which arises in asynchronous transmission, such as packet-based transmission, is deriving a clock signal to enable decoding of the packet data. This may be achieved using burst mode receivers or over-sampling receivers, but these are complex and expensive to implement.

Even with the low data rate packet header, a clock signal still conventionally needs to be extracted in order to enable the header data to be read. This may conventionally be achieved using a phase locked loop. A problem with this approach is the long time taken to synchronise the clock extraction circuit, corresponding to many bits of the data structure.

The article "Self-Clocking Scheme for Bit Synchronisation in Ultrafast Packet Switching Transparent Optical Networks" by A. Bononi et al, Electronics Letters Vol. 29, No. 10 pages 872–873 discloses an all optical header reading circuit in which a self-clocking arrangement is provided. To achieve this, a low data rate clock signal is provided in the packet structure. This is used to provide timing instants for reading data from the packet header, which is spread at the low data rate throughout the packet structure. A problem with this approach is that the packet payload is distorted, and the packet header is no longer a separate part of the packet structure.

SUMMARY OF THE INVENTION

According to a first aspect of the invention, there is provided a structure for an optical packet for transmission over an optical network, comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof.

This header structure enables the clock pulses in the first section to be used to control the timing instants when the header information in the second section is read. The header information can thus be read using the data in the header alone, without needing to alter the structure of the packet payload. The clock pulses can be delayed in order to enable them to be used to control the reading of data in the second section of the packet header.

The data in the payload may have a higher data rate than the data rate of the second section of the packet header. This enables the header to be read with circuitry which does not need to be capable of reading the packet payload.

The duration of the first section may be equal to the duration of the second section, so that the first section can be delayed to correspond in timing to the second section. Alternatively, the duration of the second section can be an integer multiple of the duration of the first section, so that the first section can be delayed a number of times to cover the second section. This enables a shorter first section of clocking data to be used, reducing the overhead associated with it.

The first and second sections may be interleaved with each other to define the packet header, or the first section precedes the second section.

According to a second aspect of the invention, there is provided an apparatus for reading data from a packet header of an optical packet transmitted over an optical network, the packet comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof, the apparatus comprising a splitter for splitting or duplicating the packet, a delay element for delaying the first section of the split or duplicated packet to provide timing instants for interpreting the second section.

Preferably, the apparatus comprises:

an opto-electric conversion circuit for converting the optical packet into an electrical signal;

a decision circuit for interpreting the electrical signal by comparing the signal with a threshold level at timing instants, the decision circuit having a timing input for controlling the timing of the timing instants; and a delay element, wherein the delay element supplies a delayed version of the electrical signal to the timing input of the decision circuit, such that the first the section of the header is used to determine the timing instants for interpretation of the second section of the header.

This apparatus enables a packet header to be read without generating a synchronised clock signal, and using only data from the packet header. The first and second sections may be interleaved with each other to define the packet header and occupy alternate positions in the packet header. The delay element then delays the electrical signal by an amount corresponding to an odd multiple of half of the bit period corresponding to the data rate. In other words, the delay element results in the clock pulses being shifted so that they occupy positions half way between their original positions. These half-way positions overlap the data in the second section. Alternatively, the first section precedes the second section, and the delay element then delays the electrical signal by an amount corresponding approximately to the duration of the first section.

The apparatus may comprise a plurality of decision circuits, and a plurality of delay elements, such that the first section of the header is delayed by a plurality of different amounts to allow different parts of the second section of the header to be interpreted by different decision circuits.

According to a third aspect of the invention, there is provided a method of reading data from an optical packet transmitted over an optical network, the packet comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof, the method comprising:

splitting or copying the optical packet to provide at least two versions of the packet delaying one version of the packet;

using the delayed packet to define the timing instants for interpretation of the packet, such that data in the first section of the packet header defines the timing instants for interpretation of the second section of the packet header.

According to a fourth aspect of the invention, there is provided a method of reading data from an optical packet transmitted over an optical network, the packet comprising a packet header and a packet payload, the packet header preceding the packet payload, wherein the packet header comprises first and second sections, and wherein the first section comprises a series of clock pulses at the data rate of the second section of the packet header or a multiple or sub-multiple thereof, the method comprising:

carrying out opto-electric conversion of the packet;

splitting or copying the electrical signal to provide at least two versions of the signal;

delaying the one version of the electrical signal; and using the delayed signal to define the timing instants for interpretation of the electrical signal, such that data in the first section of the packet header defines the timing instants for interpretation of the electrical signal derived from the second section of the packet header.

The methods of the third and fourth aspects enable the header structure of the invention to be used to carry out self-clocked interpretation of the header data.

According to a fifth aspect of the invention, there is provided an optical communications network comprising a plurality of nodes, wherein data to be transmitted between nodes is encoded as packets, each packet comprising a packet header and a packet payload, the packet header preceding the packet payload, wherein the packet header comprises first and second sections, wherein the first section comprises a series of clock pulses at the data rate of the second section of the packet header or a multiple or sub-multiple thereof, and wherein the packet headers include routing information, each node comprising an apparatus for reading the packet header which delays the first section to provide timing instants for interpreting the second section.

The apparatus for reading the packet header preferably comprises:

an opto-electric conversion circuit for converting the optical packet into an electrical signal;

a decision circuit for interpreting the electrical signal by comparing the signal with a threshold level at timing instants, the decision circuit having a timing input for controlling the timing of the timing instants; and a delay element, wherein the delay element supplies a delayed version of the electrical signal to the timing input of the decision circuit, such that the first the section of the header is used to determine the timing instants for interpretation of the second section of the header.

BRIEF DESCRIPTION OF THE DRAWINGS

Examples of the present invention will now be described in detail with reference to the accompanying drawings in which:

FIG. 2 shows a first packet format in accordance with the invention;

FIG. 3 shows how the header information can be read from the packet of FIG. 2;

DETAILED DESCRIPTION

This invention relates to the encoding of data to form an optical packet, and to apparatus for reading the header (or label) of the packet. The invention therefore relates to the physical layer of an optical packet network. This physical layer may be used to implement any desired packet switching mechanism and furthermore, as will be apparent from the following, it does not provide any constraints on the nature or encoding of the payload data within the optical packets. The packet reading and writing system may therefore be used to implement an optical packet based switching network, for example a label based switched network.

Figure 1:
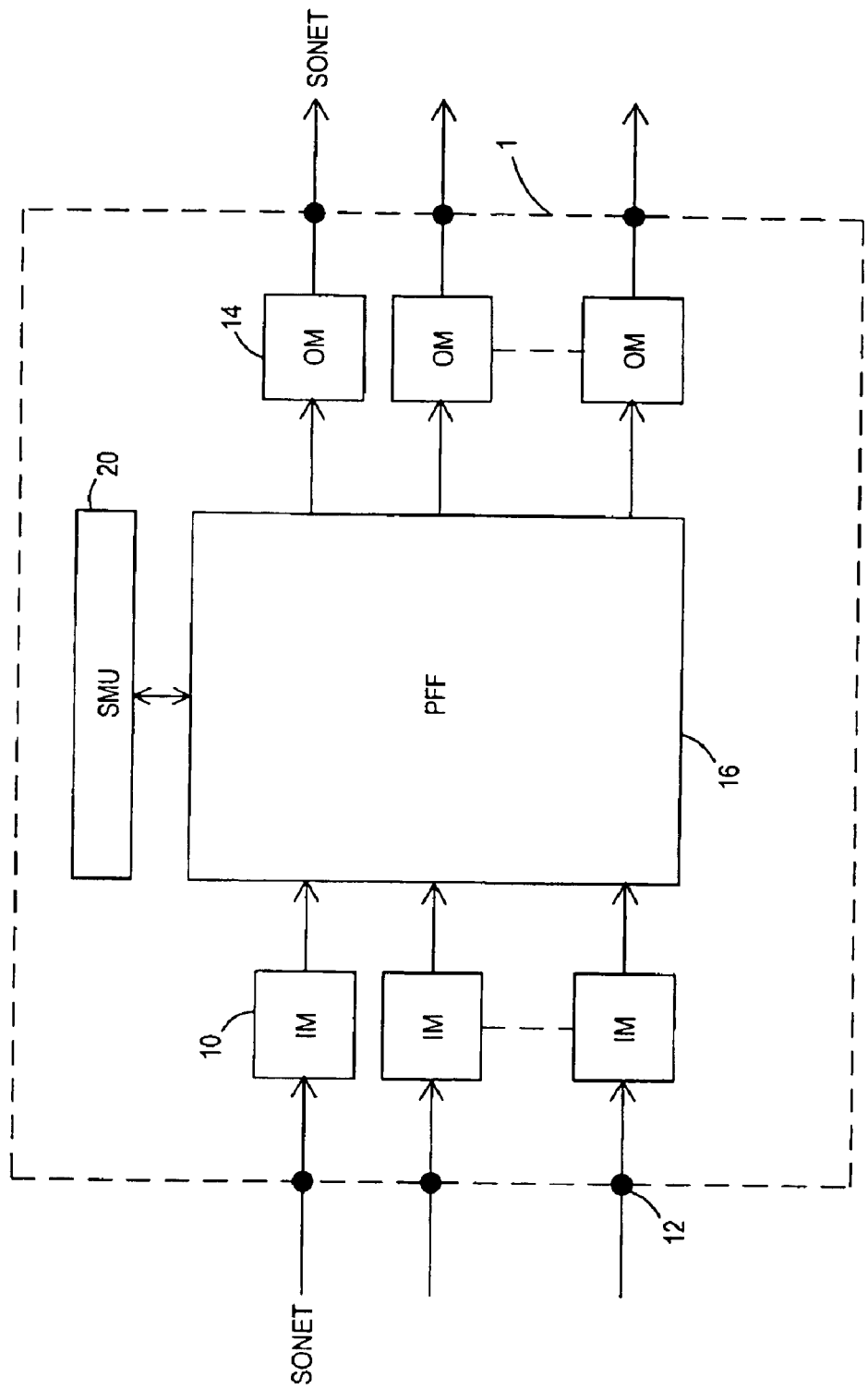
FIG. 1 shows schematically the basic operation of a packet label switch.

For the purposes of explanation, the operation of a conventional label switch operating in an optical network will be explained with reference to FIG. 1.

The fundamental operation of the switching system is to route packets according to information in the label of the packet. As will be known by those skilled in the art, the label contains all the information necessary to assign an output port for the packet. The information within the packet payloads is carried transparently by the label switched network, and the label switch processes only the labels. At the output ports of the switching system, the packets are prepared for the selected physical layer.

Packets are first received by input modules 10 at the input ports 12 of the switch 1. As one example, the physical layer may be the SONET standardised format, as shown in FIG.

1. The function of the input modules 10 is to convert the optical signals at the inputs 12 into electrical signals and to extract the packet header information from that electrical signal, i.e. from the SONET frames.

Output modules 14 perform the reverse functions of the input modules 10, and their main responsibility is to prepare packets for physical transmission over the particular physical layer system used within the network, for example SONET. Changes may also be implemented to the label information, for example to indicate that a particular optical packet has passed through a specific node. For example, the time to line (TTL) counter will be decremented in the label.

The packet forwarding fabric 16 is responsible for transferring packets between the input and output modules. There are numerous additional functions of the packet forwarding fabric, as will be apparent to those skilled in the art, but the primary function is for the switching of packets between the input and output modules. Further functions of the packet switch will not be described in detail, although a system management unit 20 is shown schematically in FIG. 1.

FIG. 2 illustrates a packet structure for use over the physical layer in accordance with the invention. This packet structure may be used to implement a packet switched network, although it may also implement any other switching configuration.

The packet includes a label or header 30 and a packet payload 32. Data may be contained in the packet payload 32 at a higher rate than in the packet header 30. The payload data is shown only schematically, as the invention concerns the structure of the header 30. The header and payload contain optical return-to-zero (RZ) pulses in the example shown in FIG. 2, and the payload data rate may be 40 Gb/s whereas the header may contain data at 2.5 Gb/s. The data rate within the payload 32 will, however, depend upon the services being provided by the optical network. It is envisaged that the data rate within the payload 32 is significantly greater than in the header 30. In particular, the data rate within the header is intended to be sufficiently low that after opto-electronic conversion the header information can be read by readily available electronic circuitry. It is also preferred that the payload 32 and header 30 are encoded by suitable modulation of a single optical carrier signal. This minimises dispersion effects during transmission of the optical packet.

The packet header 30 comprises first and second sections 34, 36. The first section 34 comprises a series of clock pulses 40 at the data rate of the second section 36 of the packet header. The duration of the first section 34 is equal to the duration of the second section 36 and the first section 34 precedes the second section 36.

The clock pulses 40 in the first section 34 are used to control the timing instants when the header information in the second section 36 is read. The header information can thus be read using the data in the header alone, without needing to alter the structure of the packet payload. The clock pulses are delayed in order to enable them to be used to control the reading of data in the second section 36 of the packet header, and this is explained further with reference to FIG. 3.

The interpretation of the data in the second section 36 involves deciding at timing instants whether a "1"or a "0" is present, by triggering a comparator circuit at the timing instants, the comparator circuit implementing a decision threshold which lies between the signal levels corresponding to "1" and "0". Conventionally, the timing at which the comparator is triggered is controlled by a clock signal which has been recovered from the incoming data. In order to avoid the need for clock extraction and synchronisation, the data in the first section 34 is used to derive the timing data for the comparator circuit. As shown in FIG. 3, the data in the first section 34 is copied and delayed to generate a replicated series of clock pulses 42 which overlap (in time) the second section 36 of the header 30. The delay needs to be an integer multiple of the bit period of the clock pulses, and all pulses in the header are arranged to occur at timing instants derived from the clock data rate. Thus, both sections of the header are obtained by modulating a single carrier at the clock data rate. In the example shown in FIG. 2, some of the pulses are suppressed in order to encode the second section 36 of the header 30.

The replicated series of clock pulses 42 are used to control the timing instants when the second section 36 is interpreted, by sampling the second section at the timing of the pulses in the series 42, as shown in FIG. 3 by arrows 44.

Figure 4:
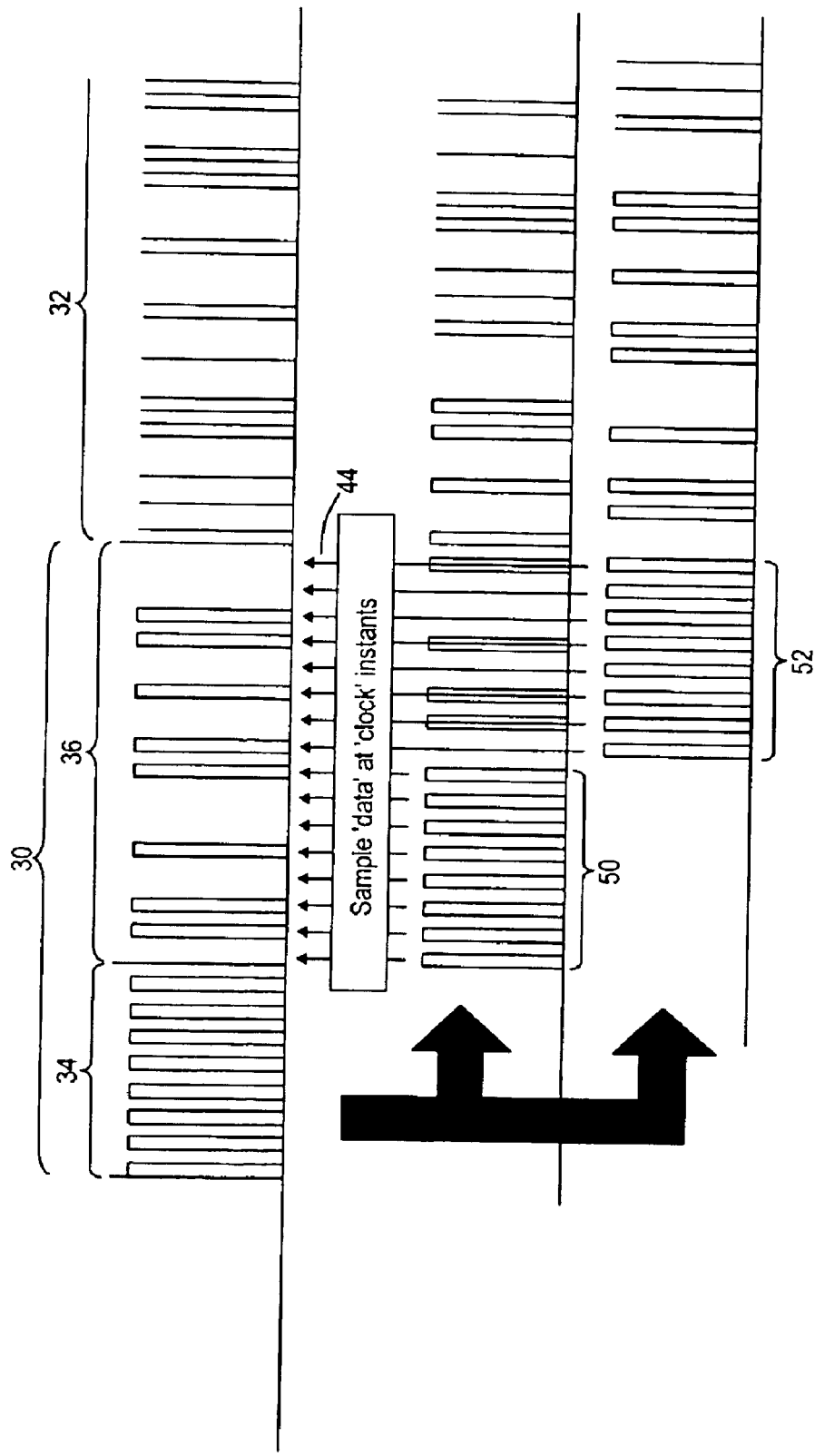
FIG. 4 shows how the header information can be read from a second packet format in accordance with the invention.

FIG. 4 shows an alternative packet structure in which the duration of the second section 36 is an integer multiple of the duration of the first section 34. In FIG. 4, the second section is twice as long as the first section. This means that a single delay can not enable the clock pulse stream to overlap all the data in the second section 36. Instead, two replicas 50, 52 of the clock pulse stream are produced by copying and delaying the first section 34 by different amounts, so that they together overlap the timing of the entire second section. Thus, the two replicated series together define the timing instants 44 at which the second section 36 is sampled to interpret the header data. This enables a shorter part of the header to be dedicated to the clock stream, reducing the overhead associated with the clock pulses.

There may be no need to read all the data in the packet header, as there may be some redundant bits. In this case, the first section (or the combined multiple versions of the first section) may be slightly shorter than the second section of the header.

Figure 5:
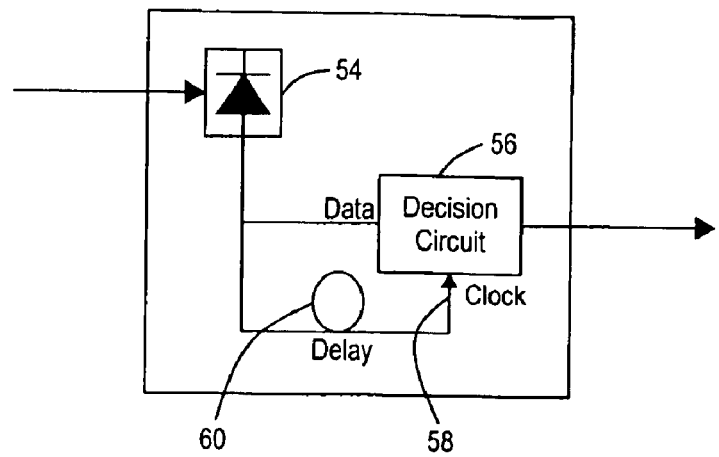
FIG. 5 shows an apparatus for reading a packet header for the packet format of FIG. 2.

FIG. 5 shows an apparatus for reading data from a packet header of a packet of the type shown in FIGS. 2 and 3. An opto-electric conversion circuit 54 in the form of a photo-diode having suitable frequency response converts the optical packet into an electrical signal. For reading the header, the conversion does not need to be capable of converting the payload data. A decision circuit 56 is used for interpreting the electrical signal by comparing the signal with a threshold level at timing instants. The decision circuit 56 has a timing input 58 for controlling the timing of the timing instants. A delay element 60 supplies a delayed version of the electrical signal to the timing input 58, so that the first section of the header is used to determine the timing instants for interpretation of the second section of the header, as explained with reference to FIG. 3.

The delay element may be arranged simply as an appropriate length of electrical conductor. For example, a data rate of 1 Gb/s in the header and with 16 bits in the first section 34 gives a 16 ns duration of the first section 34. A delay of 16 ns can be achieved with a conductor of a few meters long. Other delay elements may alternatively be used, and which may be tuneable.

Figure 6:
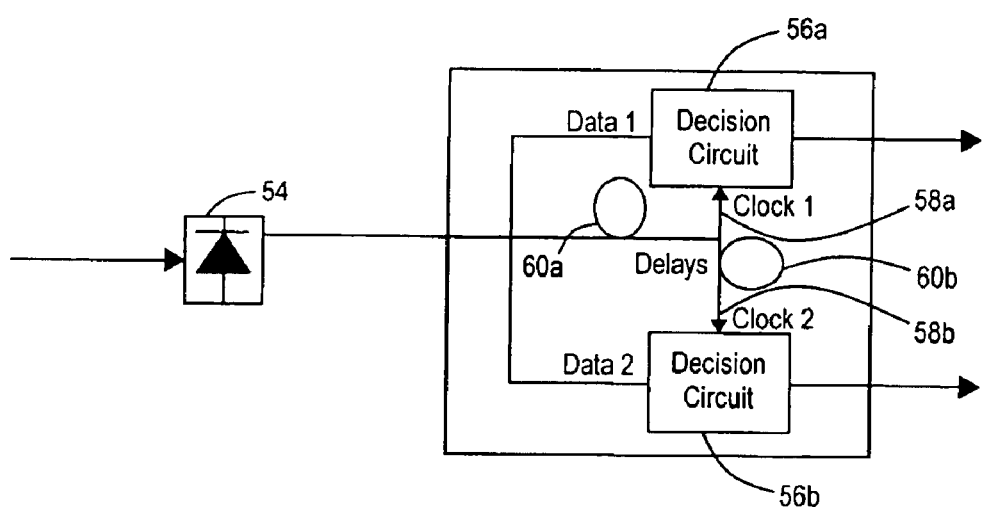
FIG. 6 shows an apparatus for reading a packet header for the packet format of FIG. 4.

FIG. 6 shows an apparatus for reading data from a packet header of a packet of the type shown in FIG. 4. Again, an opto-electric conversion circuit 54 in the form of a photo-diode having suitable frequency response converts the optical packet into an electrical signal. Two decision circuits 56a and 56b are used for interpreting the electrical signal by comparing the signal with a threshold level at timing instants. The decision circuits have timing inputs 58a and 58b and two delay elements 60a and 60b are provided so that different delays are applied to the electrical signal before reaching the timing inputs. The first section 34 of the header is thus delayed twice to cover the second section. This enables a shorter first section of clocking data to be used.

Figure 7:
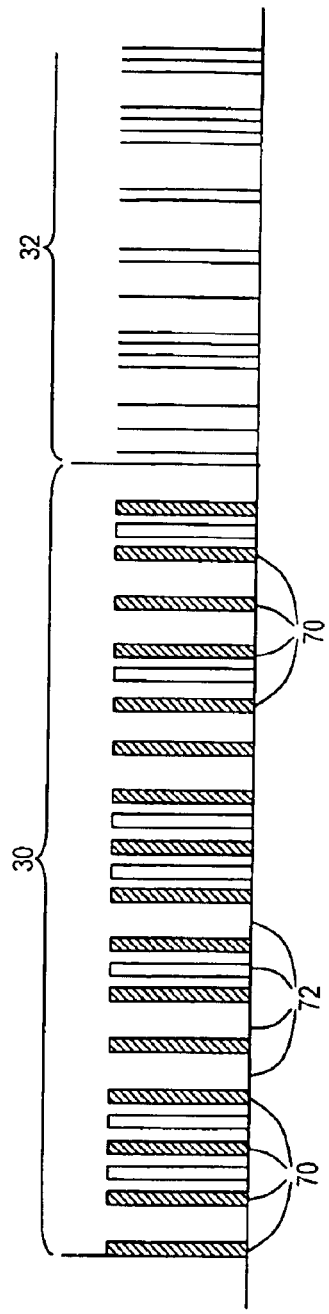
FIG. 7 shows a third packet format in accordance with the invention.

In the examples above, the first section precedes the second section. As an alternative, the clock pulses may be interleaved with the header data. For example the clock pulses and the header data pulses may occupy alternate positions in the header 30. As shown in FIG. 7, the first section comprises the clock pulses 70 (hatched in FIG. 7), and the second section comprises the pulses (or lack of signal) 72. Again, the clock pulses are at the same data rate as the header data pulses, and the two pulse trains are interleaved with each other.

In order to delay the clock pulses 70 to overlap in time the pulses of the second section, a delay of approximately half the period of the clock pulses 70 is required (or any other odd multiple of half the clock pulse period). The exact delay required depends upon the how the decision circuit is triggered (for example this may be at either edge of the clock pulse). A smaller delay is thus needed to enable the header to be read.

This implementation requires the electronics to be able to distinguish between the data and clock pulses, so that the decision circuit is clocked only by the clock pulses and not by the data pulses. For example, the timing input to the decision circuit may be disabled after each clock pulse for a period slightly less than the bit period, so as to prevent the intermediate data pulse resulting in a further clocking of the decision circuit. Alternatively, it may be possible to distinguish between the clock and data pulses in the optical domain by wavelength or polarization. They would then be separated by a wavelength demultiplexer or polarisation splitter before detection.

Figure 8:
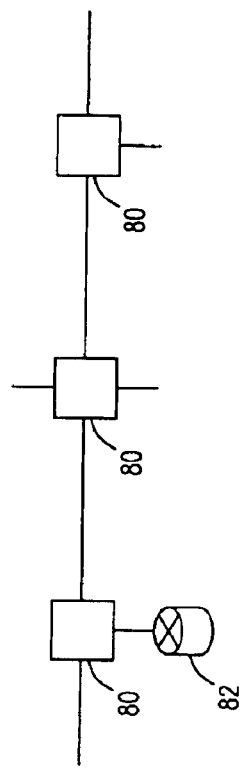
FIG. 8 shows a network in accordance with the invention.

The invention can be used in an optical communications network comprising a plurality of nodes 80, as shown in FIG. 8. Each node comprises opto-electric conversion circuitry for reading the packet header, implemented as the Input Module described with reference to FIG. 1. These input modules have a bandwidth lower than that required to read the packet payload. The node can perform routing operations based on the data read from the packet header, but it may perform additional or alternative functions, such as performance monitoring.

The invention can be applied to packet data encoded as return to zero or non-return to zero pulses, provided the clocking data can be used to control the timing of the decision circuit used to interpret the header data.

Other variations within the scope of the claims will be apparent to those skilled in the art.

What is claimed is:

1. An apparatus for reading data from a packet header of an optical packet transmitted over an optical network, the packet comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof, the apparatus comprising:

an opto-electric conversion circuit for converting the optical packet into an electrical signal;

a splitter for splitting or duplicating the electrical signal;

a delay element for delaying the first section of the split or duplicated electrical signal to provide timing instants for interpreting the second section; and a decision circuit for interpreting the electrical signal by comparing the signal with a threshold level at timing instants, the decision circuit having a timing input for controlling the timing of the timing instants, wherein the delay element supplies a delayed version of the electrical signal to the timing input of the decision circuit, such that the first section of the header is used to determine the timing instants for interpretation of the second section of the header.

2. An apparatus according to claim 1, wherein the first and second sections are interleaved with each other to define the packet header and occupy alternate positions in the packet header, and wherein the delay element delays the electrical signal by an amount corresponding to approximately to an odd multiple of half of the bit period corresponding to the data rate.

3. An apparatus according to claim 1, wherein the first section precedes the second section, and wherein the delay element delays the electrical signal by an amount corresponding approximately to the duration of the first section.

4. An apparatus according to claim 1, comprising a plurality of decision circuits, a plurality of delay elements, a plurality of decision circuits and a splitter for duplicating or splitting the signal into a plurality of different versions, such that the first sections of the header of different versions of the packet are supplied to different delay elements and are delayed by a plurality of different amounts to allow different parts of the second section of the header to be interpreted by different decision circuits.

5. An apparatus according to claim 4, wherein the first section precedes the second section, and wherein the delay elements each delay the electrical signal by a different multiple of the duration of the first section.

6. A method of reading data from an optical packet transmitted over an optical network, the packet comprising a packet header and a packet payload, the packet header preceding the packet payload, wherein the packet header comprises first and second sections, and wherein the first section comprises a series of clock pulses at the data rate of the second section of the packet header or a multiple or sub-multiple thereof, the method comprising:

carrying out opto-electric conversion of the packet;

splitting or copying the electrical signal to provide at least two versions of the signal;

delaying the one version of the electrical signal; and using the delayed signal to define the timing instants for interpretation of the electrical signal, such that data in the first section of the packet header defines the timing instants for interpretation of the electrical signal derived from the second section of the packet header.

7. A method according to claim 6, wherein the first and second sections are interleaved with each other to define the packet header and occupy alternate positions in the packet header, and wherein delaying the electrical signal comprises delaying the electrical signal by an amount corresponding to approximately to an odd multiple of half of the bit period corresponding to the data rate.

8. A method according to claim 6, wherein the first section precedes the second section, and wherein delaying the electrical signal comprises delaying the electrical signal by an amount corresponding approximately to the duration of the first section.

9. A method according to claim 6, wherein delaying the electrical signal comprises delaying the signal by a number of different delays, thereby providing a plurality of sets of timing instants for interpretation of different parts of the electrical signal derived from the second section of the packet header.

10. A method according to claim 9, wherein the first section precedes the second section, and wherein the different delays each correspond to different integer multiples of the duration of the first section.

11. An optical communications network comprising a plurality of nodes, wherein data to be transmitted between nodes is encoded as packets, each packet comprising a packet header and a packet payload, the packet header preceding the packet payload, wherein the packet header comprises first and second sections, wherein the first section comprises a series of clock pulses at the data rate of the second section of the packet header or a multiple or sub-multiple thereof, and wherein the packet headers include routing information, each node comprising an apparatus for reading the packet header which delays the first section to provide timing instants for interpreting the second section.

12. A network according to claim 11, wherein the apparatus for reading the packet header comprises:

an opto-electric conversion circuit for converting the optical packet into an electrical signal;

a splitter for duplicating or splitting the signal into a plurality of different versions;

a decision circuit for interpreting the electrical signal by comparing the signal with a threshold level at timing instants, the decision circuit having a timing input for controlling the timing of the timing instants; and a delay element, wherein the delay element supplies a delayed version of the electrical signal to the timing input of the decision circuit, such that the first the section of the header is used to determine the timing instants for interpretation of the second section of the header.

13. A network according to claim 12, wherein the opto-electric conversion circuitry has a bandwidth lower than that required to read the packet payload.

14. An optical routing device for routing optical packets comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof, the routing device comprising:

apparatus for reading the packet header comprising:

an opto-electric conversion circuit for converting the optical packet into an electrical signal;

a splitter for splitting or duplicating the electrical signal;

a delay element for delaying the first section of the split or duplicated electrical signal to provide timing instants for interpreting the second section; and a decision circuit for interpreting the electrical signal by comparing the signal with a threshold level at timing instants, the decision circuit having a timing input for controlling the timing of the timing instants, wherein the delay element supplies a delayed version of the electrical signal to the imaging input of the decision circuit, such that the first section of the header is used to determine the timing instants for interpretation of the second section of the header; and a routing arrangement for routing the packet in dependence on the data in the second section.

15. An optical node for an optical communications network in which data is transmitted as optical packets comprising a packet header and a packet payload, the packet header preceding the packet payload, wherein the packet header comprises first and second sections, and wherein the first section comprises a series of clock pulses at the data rate of the second section of the packet header, or a multiple or sub-multiple thereof, the node comprising:

apparatus for reading the packet header comprising:

an opto-electric conversion circuit for converting the optical packet into an electrical signal;

a splitter for splitting or duplicating the electrical signal;

a delay element for delaying the first section of the split or duplicated electrical signal to provide timing instants for interpreting the second section; and a decision circuit for interpreting the electrical signal by comparing the signal with a threshold level at timing instants, the decision circuit having a timing input for controlling the timing of the timing instants, wherein the delay element supplies a delayed version of the electrical signal to the timing input of the decision circuit, such that the first section of the header is used to determine the timing instants for interpretation of the second section of the header.

* * * * *